United States Patent
Alanis et al.

(10) Patent No.: US 9,828,037 B2
(45) Date of Patent: Nov. 28, 2017

(54) STRUCTURAL BEAM MEMBER WITH DUAL SIDE REINFORCEMENT RIBBING

(71) Applicant: Tesla Motors, Inc., Palo Alto, CA (US)

(72) Inventors: Luis E Alanis, Hayward, CA (US); Hussein Sanaknaki, Palo Alto, CA (US)

(73) Assignee: TESLA, INC., Palo Alto, TX (US)

( * ) Notice: Subject to any disclaimer, the term of this patent is extended or adjusted under 35 U.S.C. 154(b) by 126 days.

(21) Appl. No.: 14/856,341

(22) Filed: Sep. 16, 2015

(65) Prior Publication Data

US 2017/0073010 A1    Mar. 16, 2017

(51) Int. Cl.
*B62D 25/00*  (2006.01)
*B62D 25/08*  (2006.01)
*B62D 21/15*  (2006.01)

(52) U.S. Cl.
CPC ......... *B62D 25/087* (2013.01); *B62D 21/152* (2013.01); *B60Y 2410/121* (2013.01)

(58) Field of Classification Search
CPC .... B62D 21/15; B62D 21/152; B62D 21/155; B62D 25/087
USPC .............. 296/187.09, 187.1, 187.11, 203.04, 296/203.02
See application file for complete search history.

(56) References Cited

U.S. PATENT DOCUMENTS

| | | | |
|---|---|---|---|
| 4,200,310 A * | 4/1980 | Carney, III | B60R 19/00 188/377 |
| 6,450,567 B2 | 9/2002 | Toba | |
| 6,568,747 B2 | 5/2003 | Kobayashi | |
| 6,834,910 B2 | 12/2004 | Wendland | |
| 7,273,247 B2 | 9/2007 | Grueneklee | |
| 7,513,329 B2 * | 4/2009 | Nakashima | B60G 7/006 180/312 |
| 7,905,541 B2 | 3/2011 | Yamaguchi | |
| 8,033,596 B2 | 10/2011 | Neumann | |
| 8,585,131 B2 * | 11/2013 | Rawlinson | B62D 25/087 296/187.11 |
| 8,864,198 B2 * | 10/2014 | Kim | B60R 19/12 293/122 |
| 2012/0169089 A1 | 7/2012 | Rawlinson | |

* cited by examiner

*Primary Examiner* — Joseph D Pape
(74) *Attorney, Agent, or Firm* — Garlick & Markison; Bruce E. Garlick

(57) ABSTRACT

A structural beam component for a vehicle comprises: a beam body that has an I-section for at least part of its length, the beam body having first and second sides opposite each other, wherein the I-section extends at least partially along the first and second sides; a crash rail attachment at one end of the beam body, the crash rail attachment providing a fore-aft backup structure for a crash rail in the vehicle; another attachment at an opposite end of the beam body, the other attachment connecting the structural beam component to a side sill of the vehicle; and first and second ribbing on the first and second sides, respectively.

14 Claims, 4 Drawing Sheets

STRUCTURAL BEAM MEMBER WITH DUAL SIDE REINFORCEMENT RIBBING

BACKGROUND

Vehicles have structural members to provide rigidity for handling challenging road conditions, and for transferring and absorbing loads during a crash. The vehicle can have one or more members that connect a bumper structure to a mid-vehicle structural member, such as a side sill. Previous approaches have involved a low-pressure casting of such structural member. However, such approach can produce a part that is heavy, expensive, and difficult to make, and/or the part may require repair and re-working before installation.

SUMMARY

In a first aspect, a structural beam component for a vehicle comprises: a beam body that has an I-section for at least part of its length, the beam body having first and second sides opposite each other, wherein the I-section extends at least partially along the first and second sides; a crash rail attachment at one end of the beam body, the crash rail attachment providing a fore-aft backup structure for a crash rail in the vehicle; another attachment at an opposite end of the beam body, the other attachment connecting the structural beam component to a side sill of the vehicle; and first and second ribbing on the first and second sides, respectively.

Implementations can include any or all of the following features. The first ribbing is about equally dense as the second ribbing. At least part of the first ribbing extends further from the first side than the second ribbing extends from the second side. The first ribbing and the first side correspond to an ejector side during a casting process for the structural beam component, and wherein the second ribbing and the second side correspond to a cover side during the casting process. There is about an equal amount of the first ribbing as of the second ribbing. The structural beam component is a rear node for the vehicle, and wherein the crash rail is a rear crash rail. The structural beam component further comprises an O-section. The O-section forms the crash rail attachment. Each of the first and second ribbing comprises bosses connected by ribs, the bosses and ribs forming a pattern between respective cross beams of the I-section. Some of the bosses comprise attachment points for other vehicle components.

In a second aspect, a structural beam system for a vehicle comprises: a structural beam component comprising a beam body that has an I-section for at least part of its length with first and second sides opposite each other, the I-section extending at least partially along the first and second sides, wherein the structural beam component has first and second ribbing on the first and second sides, respectively; a crash rail having and end attached to the structural beam component; and a bumper plate attached at an opposite end of the crash rail, the bumper plate having brackets with respective reinforcements configured to initiate folding of the crash rail at the bumper plate.

Implementations can include any or all of the following features. The bumper plate comprises brackets attached to a bumper and to the crash rail, each of the brackets having portions that form essentially an L-shape, wherein the reinforcement is configured to extend between the portions. At least one of the reinforcements comprises a gusset. At least one of the reinforcements comprises a rib.

In a third aspect, a method comprises: casting a structural beam component that comprises a beam body with an I-section for at least part of its length and first and second sides opposite each other, the structural beam component having first and second ribbing on the first and second sides, respectively, wherein the first ribbing extends further from the first side than the second ribbing extends from the second side, wherein the first ribbing and the first side correspond to an ejector side of a die during the casting, and wherein the second ribbing and the second side correspond to a cover side of the die during the casting; after casting the structural beam component, separating the cover side and the ejector side of the die from each other, wherein due to the first ribbing the structural beam component remains with the ejector side during separation; and after separating the cover side and the ejector side, ejecting the structural beam component from the ejector side of the die.

DETAILED DESCRIPTION

This document describes examples of systems and techniques for providing a backup structure in a vehicle. The body-in-white defines a load path for impact scenarios, and a structural beam component can be located in that load path so as to provide the backup structure for another component. In some implementations, a structural member has I- and C-beam cross sections and ribbing that provides stiffness and strength. The walls of the member can be made thin for weight reduction. For example, the backup structure can facilitate folding by another component (e.g., a crash rail) so as to absorb energy from an impact. The structural beam component can be manufactured as predominantly an I-beam cross section using a high pressure die casting process. The I-profile can be ribbed to provide strength in fore-aft loading, for example as may be required for a stable initiation and development of a crash rail. In some implementations, a structural beam component can provide sideways moment strength above a vehicle suspension, which can allow the loading on a subframe to be reduced. For example, placing less load on a subframe can prevent or reduce damage to a sensitive vehicle component (e.g., a high-voltage battery pack) in the event of a crash. A structural beam component can preserve linear structural attributes of the body-in-white, for example so as to improve noise-vibration-harshness characteristics or durability.

For purposes of illustration, some examples herein will describe a structural member as being designated for the rear of a vehicle, and acting as backup structure for a rear crash rail. For example, one (or each) end of the vehicle can have two such structural members, one for each of two crash rails. In other implementations, a structural member can be positioned elsewhere in a vehicle. For example, the member can protect against frontal impact (e.g., together with a front crash rail) or side impact.

Also, the present description is provided without any assumption about the type of vehicle where the member is used. For example, some vehicles have four wheels but some implementations can be used with vehicles having more or fewer wheels than four. Also, the vehicle can have one or more traction motors (including, but not limited to, an electric motor), which can be used for driving one or more wheels of the vehicle (e.g., in form of two-wheel drive or all-wheel drive).

Figure 1:
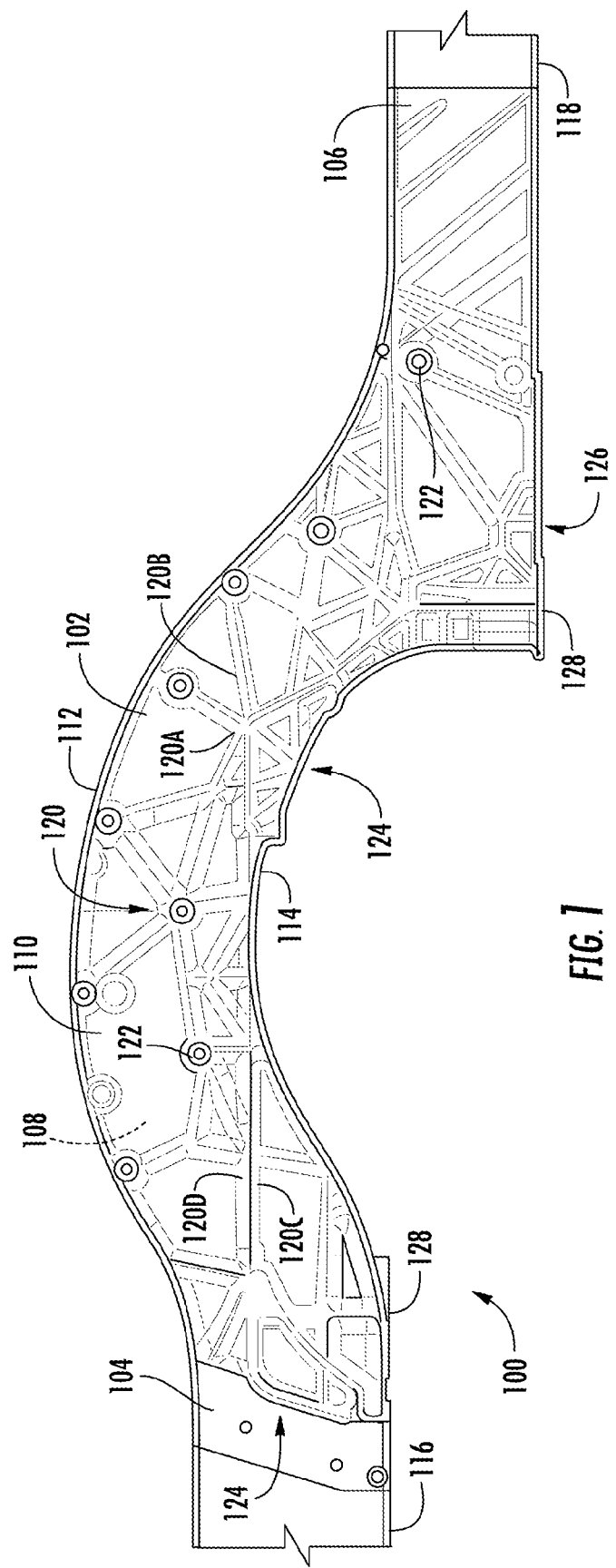
FIG. 1 shows a side view of an example of a structural beam component.

FIG. 1 shows a side view of an example of a structural beam component 100. The component here consists of a beam body 102 that has an I-section for at least part of its length, a crash rail attachment 104 and another attachment 106. The beam body defines a first side 108 (currently hidden) and a second side 110 opposite each other. The I-section here extends at least partially along the first and second sides and is defined between respective cross beams 112 and 114 that are perpendicular to the plane of the drawing. The second side which is here visible can be considered the cover side of the part, whereas the first side can be considered the ejector side. For example, the structural beam component 100 can be positioned on the left side in the direction of forward travel. Accordingly, the present illustration shows the member from the inboard side.

The crash rail attachment 104 is located at one end of the beam body. Here, for example, the attachment is positioned at the rear end of the body. The crash rail attachment provides a fore-aft backup structure for a crash rail 116 in the vehicle. In some implementations, the structural beam component can be considered a rear node for the vehicle, and the crash rail is a rear crash rail. For example, the crash rail can be an extruded component that defines one or more longitudinal cells along its length; the crash rail can be configured so that upon impact it begins folding in essentially a predefined manner, thereby absorbing impact energy and protecting other vehicle components and passengers from crash loads. The structural beam component therefore provides a backup structure for the crash rail so as to facilitate such folding.

The structural beam component can have one or more other sections in addition to the I-section. In some implementations, the member has an O-section for at least part of its length. For example, the O-section can define the crash rail attachment 104 (e.g., so that the end of the crash rail fits inside the end of the member). The O-section profile can be formed in any suitable way, for example by welding one or more parts to the body of the structural member.

The other attachment 106 is located at an opposite end of the beam body. In some implementations, the other attachment connects the structural beam component to another part of the vehicle's body structure. For example, a side sill 118 that extends along some or all of the vehicle side can be connected to the member. In some implementations, the other attachment has a profile different from the rest of the structural beam, such as a Z-section. For example, the attachment has one surface adapted to abut the side of the side sill, a flange perpendicular to that surface extends on top of the sill in one direction, and another flange perpendicular to the surface extends away from the sill in the opposite direction.

The structural beam component has ribbing on both the sides 108 and 110. Here, ribbing 120 on the second side includes a number of bosses 120A connected by ribs 120B. That is, each boss is a piece of structure where two or more ribs meet. The bosses and ribs can be formed together with the rest of the structural member (e.g., in a casting operation). Each of the ribs includes a base 120C that extends along the surface of the second side, and an extended portion 120 that extends from the base and away from the surface of the second side. For example, the cross beams 112 and 114 that here define the I-section can extend further from the respective first and second sides that do the extended portions.

The bosses and ribs of the ribbing define patterns on the first and second sides of the structural beam component. These patterns can be different from each other. In some implementations, rather than the structural member simply having a C- or I-sectional shape, the ribbing reinforces the section to create the equivalent of a solid part. For example, this can allow the member to be optimized to only have material where it is needed. Also, the ribbing and the pattern it creates can allow the member to be made with thinner walls while maintaining its structural stiffness and rigidity, which reduces weight and lowers material costs.

Some bosses can serve another purpose as well. In some implementations, bosses 122 on the second side are also attachments for one or more other parts. For example, this can allow the structural member to connect to multiple parts across the vehicle so as to improve crash protection, stiffness and durability.

Here, the structural beam component 100 can provide attachment for other parts of the vehicle's body structure. For example, areas 124 formed by bosses and ribs are generally triangular, and can be used for anchoring the beam member and a cross member of the vehicle to each other. As another example, an area 126 is generally delta-shaped and can be used for another cross member. Attachment points 128 defined in the generally I-profiled area can provide a place for attaching a subframe for a vehicle suspension. For example, bushings of the subframe can be attached at the points 128.

Figure 2:
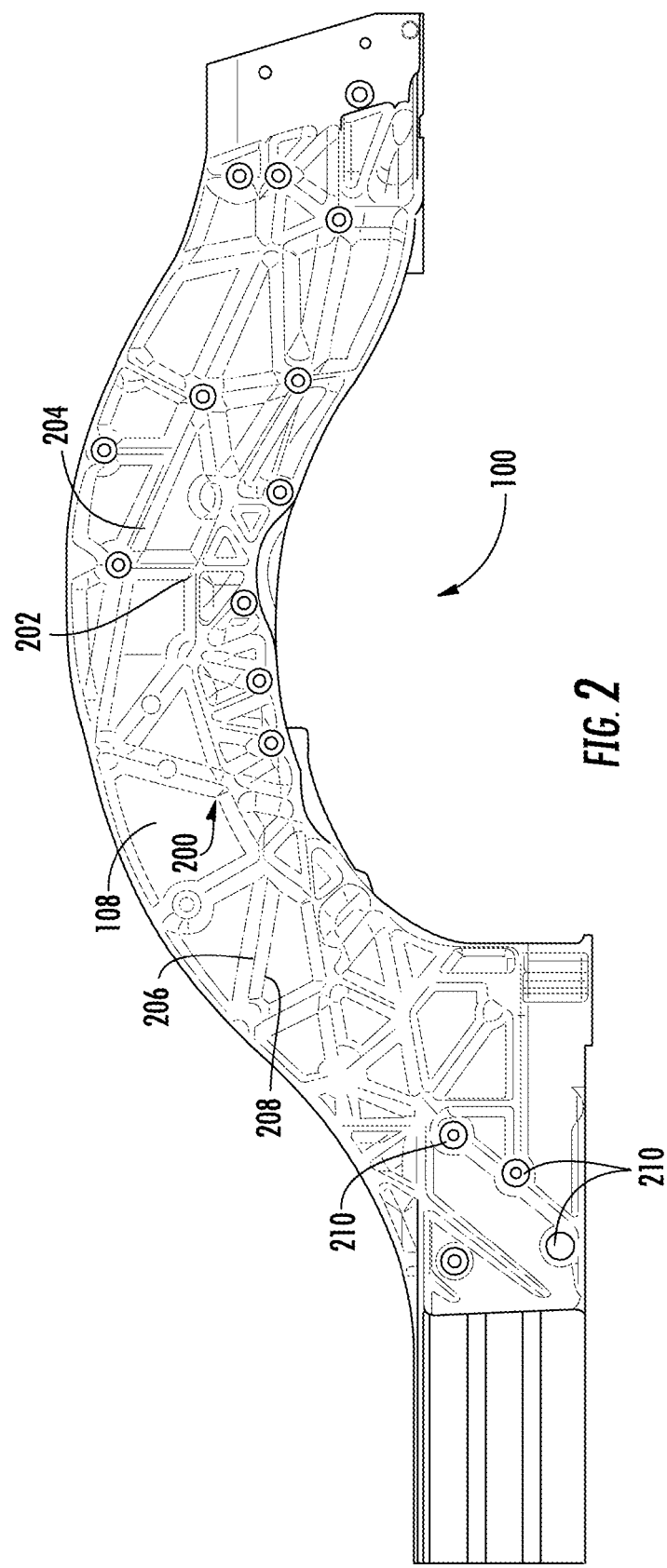
FIG. 2 shows another side view of the structural beam component.

FIG. 2 shows another side view of the structural beam component 100. This view shows the first side 108 which has ribbing 200. Similar to the ribbing on the second side, the ribbing 200 here includes bosses 202 connected by ribs 204, and each rib can include an extended portion 206 that is connected to the first side by way of a base 208. Bosses 210 can be used as attachments for the side sill, such as using bolts. This illustration shows the member from the outboard side.

The ribbing 200 can be about equally dense as the ribbing on the second side. For example, the number of bosses, and/or the length of ribs, per unit of area can be essentially similar. As another example, the amount of ribbing on one of the sides can be about equal to the amount on the other side, such as that the number of bosses and/or the length of ribbing can be essentially similar.

The ribbing 200 and the ribbing on the other side can differ from each other in one or more regards. For example, one of the ribbings can form a pattern that is somewhat or completely different from that on the other side, such as by having one or more bosses and/or ribs in a position where the other ribbing does not. As another example, one of the ribbings can at least in part be taller than the other. For example, some or all of the extended parts on the first side can be taller than the extended parts on the second side. This can provide advantages in manufacturing and/or regarding stiffness or strength.

The configuration of the structural beam component to generally have an I-sectioned profile with other profile elsewhere as needed, and with the reinforcement provided by the ribbing on each side, provides useful connectability to other parts and an improved stiffness and durability. In some implementations, the beam member can vary between C- and I-sections and have a closed O-section and/or a Z-section as needed. This helps the member provide the backup structure for another body structure, such as a crash rail, so that the rail deforms and absorbs energy without fracturing. In some implementations, this approach can reduce weight, improve quality, reduce costs and/or facilitate mass production of a high volume part. For example, the amount of machining operations can be reduced. As another example, space inside the vehicle can be saved.

Figure 3:
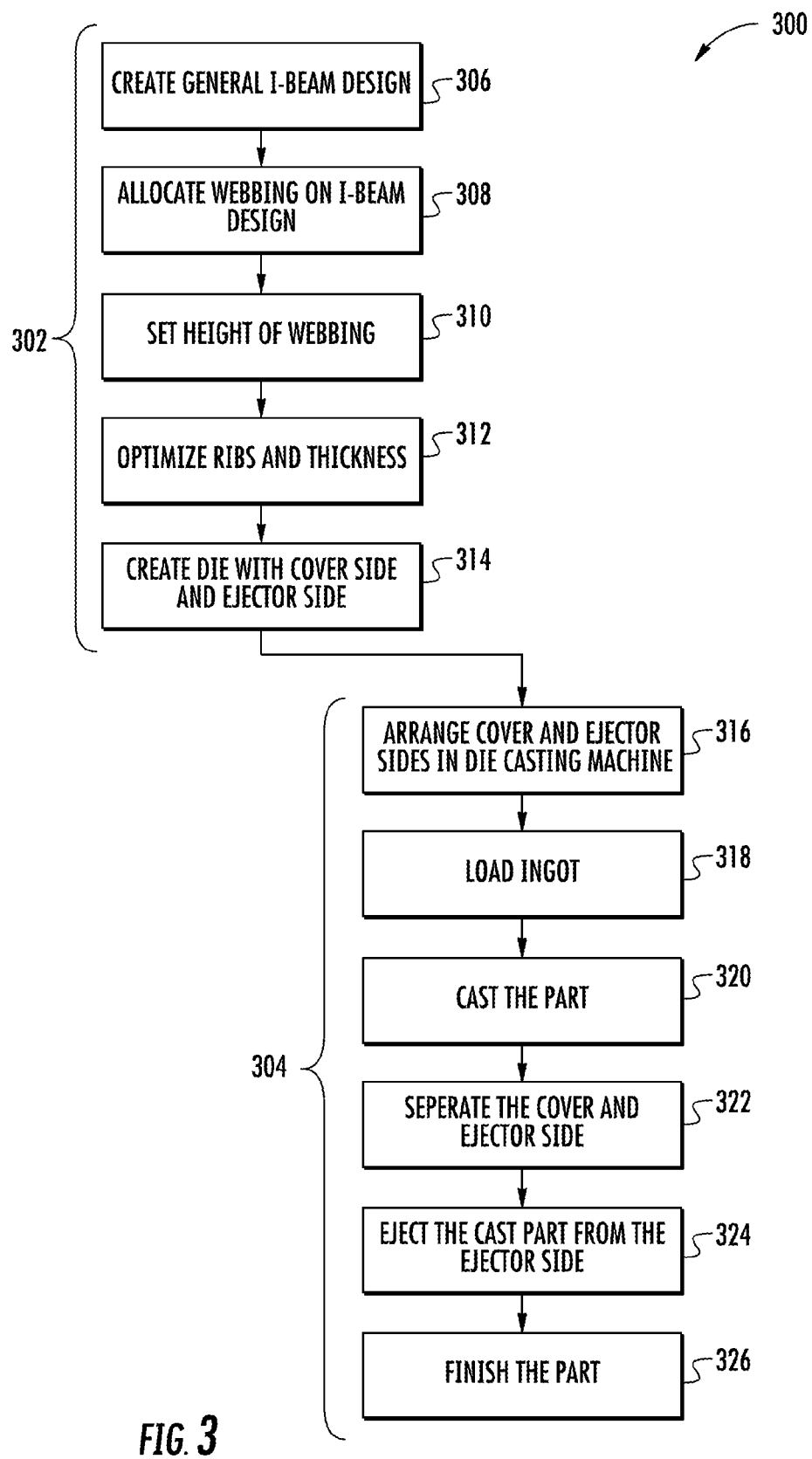
FIG. 3 shows examples of operations that can be performed in a design stage or a manufacturing stage.

FIG. 3 shows examples of operations 300 that can be performed in a design stage or a manufacturing stage. In some implementations, a group 302 of the operations are directed more towards the design stage, and a group 304 more towards the manufacturing stage. For example, the operations in group 302 are performed to create a die that is then used a number of times during manufacturing in group 304.

At 306, a general I-beam design is created. In some implementations, this is done using a computer-assisted engineering (CAE) iterative development and optimization process. With reference to FIG. 1 as an example, the design can be created to have mostly an I-section profile with the cross beams 112 and 114 and the respective sides 108 and 110.

At 308, ribbing is allocated on the I-beam design, such as using the CAE process. In some implementations, the ribbing can include multiple bosses on each of the sides, the bosses connected by a plurality of ribs. For example, the ribbing 120 (FIG. 1) can be applied on the side designated as the cover side, and/or the ribbing 200 (FIG. 2) can be applied on the side designated as the ejector side.

At 310, the height of the ribbing is set, such as using the CAE process. In some implementations, the ribbing on the ejector side is taller than the ribbing on the cover side. For example, the ejector-side ribbing can be about twice the height, or more, of the cover-side ribbing.

At 312, ribs and/or thickness can be optimized. In some implementations, this is done using a CAE process. For example, this involves evaluating the stiffness and strength of the modeled part under various circumstances, establishing the placement of ribs, and/or the thickness of any aspect of the design, using topology optimization and/or thickness optimization, and re-evaluating the new design.

At 314, a die is created that has a cover side and an ejector side. This die can be configured for use in high pressure die casting. For example, the respective sides of the die can be made so that when they are brought together, they form a cavity that essentially corresponds to the designed shape of the structural component. The die provides one or more inlets for liquid material (e.g., metal) and can provide one or more outlets (e.g., for creating a vacuum that helps draw liquid material into the die).

That is, the operations in the group 302 can create one die that corresponds to a specific part. If different parts should be created, the operations can be repeated to create another die.

Turning now toward operations that relate more to the manufacturing process, at 316 the cover and ejector sides of the side can be arranged in a die casting machine. For example, the cover side is installed so as to essentially not move during a casting process, and the ejector side is installed so as to be movable between at least a closed position (e.g., such that the sides together define the cavity for the part) and an open position (e.g., such that the sides are spaced apart from each other).

At 318, an ingot is loaded to provide the material for the casting. In some implementations, the ingot is heated to a liquid or near-liquid state, and is thereafter placed inside a sleeve that feeds into the die. For example, the ingot can include an aluminum alloy.

At 320, the part is cast. In some implementations, this involves ramming the molten metal in the sleeve with a shot rod or other piston so that the material is forced into the die at high speed and pressure. For example, a vacuum can be drawn from the other side of the cavity to aid this process. The cast part is then allowed to cool down at least part of the way from the elevated temperature.

At 322, the cover and ejector sides are separated from each other. This can involve moving the ejector side away from the stationary cover part. The portion of the cast part that is inside the ejector side will essentially remain there during the separation, while the portion that is inside the cover side will be removed from that side. For example, a taller ribbing on the ejector side of the designed part can help ensure that the part remains on the ejector side, and so do higher draft angles on the cover side or minor undercuts on the ejector side.

At 324, the cast part is ejected from the ejector side. That is, the ejector side of the die can have an ejector mechanism, such as one or more rods that are configured to push the cast part out of the cavity after casting, and it is therefore important to ensure that the part does not stick inside the cover part during the separation at 320. Thereafter, the die can be used to produce another part of the same design, or a different die can be installed to make a different part.

At 326, the part can be finished. For example, casting artefacts can be removed, and other machining or finishing steps can be performed, to create a finished part.

It has been mentioned that a structural beam component can serve as part of a larger load-path system, for example as shown in FIG. 1 by attachment to the crash rail 116 or the side sill 118. An example will now be provided.

Figure 4:
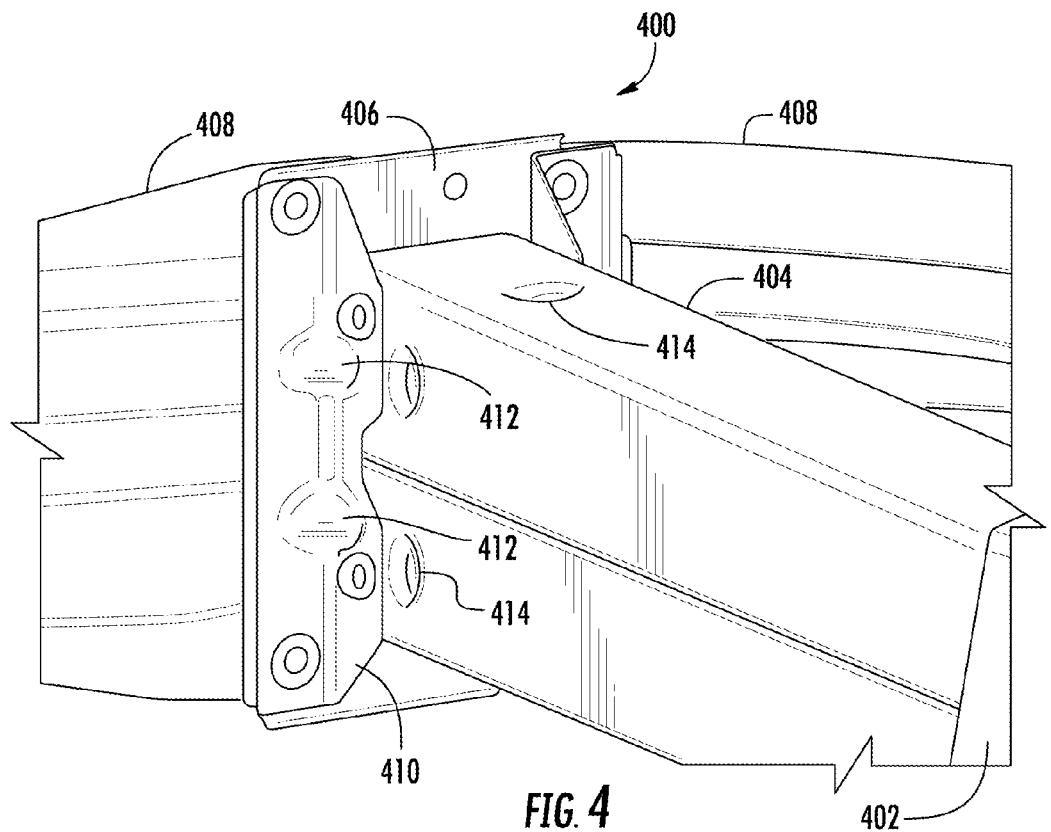
FIG. 4 shows an example of a bumper plate that can be used with a structural beam component.

FIG. 4 shows an example of a bumper plate 400 that can be used with a structural beam component 402. The part of the structural beam component shown here is a crash rail attachment (e.g., formed by an O-section of the beam) and this can be attached to a crash rail 404. For example, the bumper plate can include a plate 406 that abuts a bumper 408, such as the rear bumper. The bumper plate can include one or more brackets 410. In some implementations, the bracket has at least one reinforcement 412. The bracket can have respective portions that form an L-shape, here between the crash rail and the plate, and the reinforcement can be configured to extend between these portions. For example, the reinforcement can be a gusset created by stamping, such as in cases where the bracket is a stamped part. As another example, the reinforcement can be a cast rib, such as when the bracket is a cast part.

The crash rail can have one or more initiators 414 to provide folding along a predetermined pattern upon impact. For example, when the vehicle hits something with the bumper, or another vehicle runs into it, the crash rail can fold into the pattern to absorb the impact. The folding of the crash rail should start at the end that is near the bumper, as opposed to further along the rail or at the other end thereof.

Figure 5:
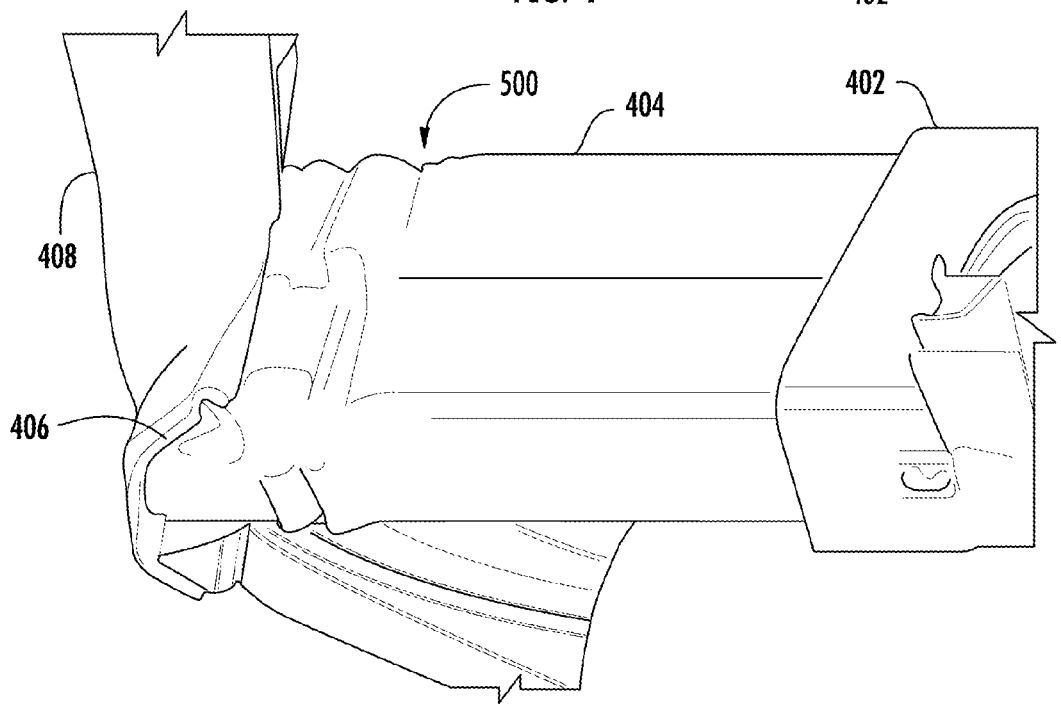
FIG. 5 shows an example of a folding pattern of the crash rail in FIG. 4.

FIG. 5 shows an example of a folding pattern 500 of the crash rail 408 in FIG. 4. That is, an impact was sustained on the bumper 408 and because the structural beam component acted as a backup structure, such as by the crash rail attachment 402, the crash rail folded into the pattern 500. The folding is here partial; in other situations, the rail can be folded along a longer or shorter part of its length.

Moreover, the bracket with one or more reinforcements can provide a useful initiation of the folding. At the start of the high speed rear crash, the bumper and the plate can rotate around a vertical axis so as to pass by the bumper plate. This can cause the inboard bracket to indent the rail, thus creating a rail imperfection that leads to initiation of the folding starting downstream from the bumper plate This can be an advantageous way to start the folding, rather than, say, creating an instability at the joint area with the structural beam member. For example, in the latter situation, an instability can develop in the joint area between the beam member and the crash rail that can cause a less controlled crash rail folding, which can lead to loss of energy dissipation during a crash. That is, when the inboard attachment to the rail is made strong enough by way of stiffening features such as stamping gussets or casting ribs, the crash rail folding initiation and development can acquire a mode robustness, consisting of the folding initiating at the bumper plate side of the rail (as opposed to at the rear node), therefore reducing the need for reinforcing the node-rail joint area.

A number of implementations have been described as examples. Nevertheless, other implementations are covered by the following claims.

What is claimed is:

1. A structural beam component for a vehicle, the structural beam component comprising:
    a beam body that has an I-section for at least part of its length, the beam body having first and second sides opposite each other, wherein the I-section extends at least partially along the first and second sides;
    a crash rail attachment at one end of the beam body, the crash rail attachment providing a fore-aft backup structure for a crash rail in the vehicle;
    another attachment at an opposite end of the beam body, the other attachment connecting the structural beam component to a side sill of the vehicle; and
    first and second ribbing on the first and second sides, respectively.

2. The structural beam component of claim 1, wherein the first ribbing is about equally dense as the second ribbing.

3. The structural beam component of claim 1, wherein at least part of the first ribbing extends further from the first side than the second ribbing extends from the second side.

4. The structural beam component of claim 3, wherein the first ribbing and the first side correspond to an ejector side during a casting process for the structural beam component, and wherein the second ribbing and the second side correspond to a cover side during the casting process.

5. The structural beam component of claim 1, wherein there is about an equal amount of the first ribbing as of the second ribbing.

6. The structural beam component of claim 1, wherein the structural beam component is a rear node for the vehicle, and wherein the crash rail is a rear crash rail.

7. The structural beam component of claim 1, wherein the structural beam component further comprises an O-section.

8. The structural beam component of claim 7, wherein the O-section forms the crash rail attachment.

9. The structural beam component of claim 1, wherein each of the first and second ribbing comprises bosses connected by ribs, the bosses and ribs forming a pattern between respective cross beams of the I-section.

10. The structural beam component of claim 9, wherein some of the bosses comprise attachment points for other vehicle components.

11. A structural beam system for a vehicle, the structural beam system comprising:
    a structural beam component comprising a beam body that has an I-section for at least part of its length with first and second sides opposite each other, the I-section extending at least partially along the first and second sides, wherein the structural beam component has first and second ribbing on the first and second sides, respectively;
    a crash rail having and end attached to the structural beam component; and
    a bumper plate attached at an opposite end of the crash rail, the bumper plate having brackets with respective reinforcements configured to initiate folding of the crash rail at the bumper plate.

12. The structural beam system of claim 11, wherein the bumper plate comprises brackets attached to a bumper and to the crash rail, each of the brackets having portions that form essentially an L-shape, wherein the reinforcement is configured to extend between the portions.

13. The structural beam system of claim 11, wherein at least one of the reinforcements comprises a gusset.

14. The structural beam system of claim 11, wherein at least one of the reinforcements comprises a rib.

* * * * *